United States Patent

[11] 3,530,867

| [72] | Inventor | Robert H. Hass |
| | | Fullerton, California |
| [21] | Appl. No. | 857,138 |
| [22] | Filed | Sept. 11, 1969 |
| | | Division of Ser. No. 483,636, Aug. 30, 1965, now Pat. No. 3,491,585, Jan. 27, 1970. |
| [45] | Patented | Sept. 29, 1970 |
| [73] | Assignee | Union Oil Company of California Los Angeles, California a corporation of California |

[54] METHOD FOR BLENDING VOLATILE LIQUIDS
3 Claims, 2 Drawing Figs.

[52] U.S. Cl................................................. 137/3, 137/88
[51] Int. Cl........................................G05d 11/02, G01n 11/00
[50] Field of Search.......................................... 137/3, 88; 73/53

[56] References Cited
UNITED STATES PATENTS

| 3,276,460 | 10/1966 | Feld............................. | 137/3 |
| 3,385,680 | 5/1968 | Feld et al...................... | 137/3 |
| 3,332,856 | 7/1967 | Hart............................. | 73/53X |

Primary Examiner—Robert G. Nilson
Attorneys—Milton W. Lee, Richard C. Hartman, Lannas S. Henderson, Robert E. Strauss and Dean Sandford ABSTRACT: A method and apparatus for continuously measuring the vapor-liquid ratio of a volatile liquid at a preselected temperature, and a method for continuously blending a plurality of liquid components of varying volatilities to continuously produce liquid product having a controlled intermediate vapor-liquid ratio measured at the preselected temperature.

Patented Sept. 29, 1970

INVENTOR.
ROBERT H. HASS

BY Dean Sandford

ATTORNEY

METHOD FOR BLENDING VOLATILE LIQUIDS

This application is a division of application Ser. No. 483,636, filed Aug. 30, 1965, now Pat. No. 3,491,585, Jan. 27, 1970.

This invention relates to an apparatus and method for continuously measuring the vapor-liquid ratio of a volatile liquid, and in particular to a continuous method of blending gasoline and other volatile liquids to predetermined vapor-liquid ratios.

The volatility of gasoline and other volatile liquid composition is often desirably controlled so that the blended product has a preferred volatility characteristic, volatility being defined as the amount of the liquid vaporized at any specific temperature and pressure. In the case of motor gasoline, superior performance is achieved with a gasoline having a volatility selected with consideration for the operating conditions under which it is to be used. Engines fueled with gasoline having too low volatility are difficult to start, whereas gasoline having excessive volatility can cause vapor lock at engine operating conditions. Thus, gasoline volatility must be controlled between these limits to attain satisfactory engine performance. Desired volatility is achieved by blending into the gasoline components of different volatilities; it frequently being economically desirable to add a maximum quantity of a relatively low value, high volatility component, such as butane or natural gasoline, so long as the volatility specification for the blended product is not exceeded. Under these conditions, profitability is strongly influenced by the closeness to which the final blend approaches the maximum volatility specification.

Gasoline volatility was formerly commonly characterized by Reid vapor pressure. However, because Reid vapor pressure is not directly related to volatility, many problems are encountered in attempting to use this parameter to control the vapor locking tendency of motor gasolines. For this reason, the concept of vapor-liquid ($V/L$) ratio was developed to provide a direct measurement of fuel volatility. The vapor-liquid ratio of a gasoline, or other multicomponent volatile material, at any specified temperature and pressure, is defined as the ratio of the volume of vapor in equilibrium with liquid, at that temperature and pressure, to the volume of sample charged, as a liquid, at 32°F. A proposed laboratory method for testing the vapor-liquid ratio of gasoline is presented in the 1965 Book of ASTM Standards, Part 17, pages 1030—1035. Even where vapor pressure specifications on the final gasoline product are maintained, the vapor-liquid ratio is usually the controlling specification and becomes limiting before the maximum vapor pressure is reached.

In application, the numerical value of the maximum allowable vapor-liquid ratio is often set at a value dependent on a number of factors, such as the quality level desired to be maintained for a particular grade of gasoline, the type of equipment in which the gasoline is primarily used, the percentage of market satisfaction desired, etc. Once the numerical value of vapor-liquid ratio is established, gasoline volatilities are controlled by varying the conditions under which the vapor-liquid ratio is determined. Ordinarily, the pressure is set at a standard value, such as 760 mm. Hg, and the temperature set at a value approximating under-hood temperatures during a particular season and for a specific geographical area. Seasonal and geographic volatility control is then achieved by merely specifying the temperature at which the vapor-liquid ratio is measured. The performance of a gasoline of any particular volatility level can be ascertained by road test of the gasoline under actual road conditions.

Thus, the problem encountered in producing a particular gasoline blend is to attain a composition having a vapor-liquid ratio closely approaching the maximum specification value, while also optimizing all other quality characteristics. Normally, vapor-liquid ratios of the various blend stocks are determined by laboratory analysis and an optimum composition determined by calculation. This calculation can be verified by a laboratory or pilot blend simulating the proposed production composition. Adjustments in the composition can be made, if necessary. This method of predicting the quality of the finished product can be inaccurate, particularly where gasoline stocks are being concurrently produced into the blending stock tankage. Heretofore, blending control was not so critical as the gasoline was blended into tankage and tested for quality. Necessary adjustments were made by adding additional components until a final product of the desired quality was attained, which was then available for shipment. However, with the advent of the continuous method of gasoline blending, the product gasoline is frequently produced directly into common carrier pipelines, tank ships, remote shipping tanks, etc., where product reblending is impractical. Although the blended product can be sampled and analyzed from time to time during the blending operation, it is difficult to control quality effectively by such spot sampling. Due to the increased necessity of assuring that gasoline blended continuously meets specification, the closeness to which product specifications can be approached is further limited.

Accordingly, a primary object of this invention is to provide means for continuously measuring the vapor-liquid ratio of a blended product. A further object is to provide means for continuously measuring the vapor-liquid ratio of a blended product as the product is blended. A still further object is to adapt these vapor-liquid ratio measuring means to the continuous control of the vapor-liquid ratio of a blended product. An additional object of this invention is to provide a continuous method of gasoline blending wherein the vapor-liquid ratio of the blended products is controlled to a predetermined value. Other objects and advantages of the invention will be apparent from the following description and appendant drawings, of which:

According to the method of this invention, the vapor-liquid ratio of a multicomponent liquid mixture can be determined at any selected test temperature by heating a flowing stream of the liquid to the test temperature under steady state conditions so that the volatile constituents of the liquid mixture are vaporized, disengaging the vapor from the liquid residue, and dividing the volume flow rate of the vapor by the volume flow rate of the liquid sample. Vaporization is accomplished by passing the liquid sample downwardly through a vaporization tube located in a constant temperature zone maintained at the test temperature. The combined liquid and vapor effluent from the vaporization tube are discharged into a falling film vapor-liquid separator positioned within the constant temperature zone immediately beneath the vaporization tube so that the liquid phase flows downwardly along the interior walls of the separator. The liquid residue is withdrawn from the vapor-liquid separator so as to prevent accumulation of a liquid reservoir in the separator. The vapor fraction is also separately withdrawn from the separator and the volume flow rate of vapor measured. Signals proportional to the liquid feed and vapor volume flow rates can form the input to an analog computing device which calculates the vapor-liquid ratio from the two measured volume flow rates. The output of the analog computer is employed to control the proportion of the volatile components in the blended product so as to produce a product having a predetermined vapor-liquid ratio.

Figure 1:
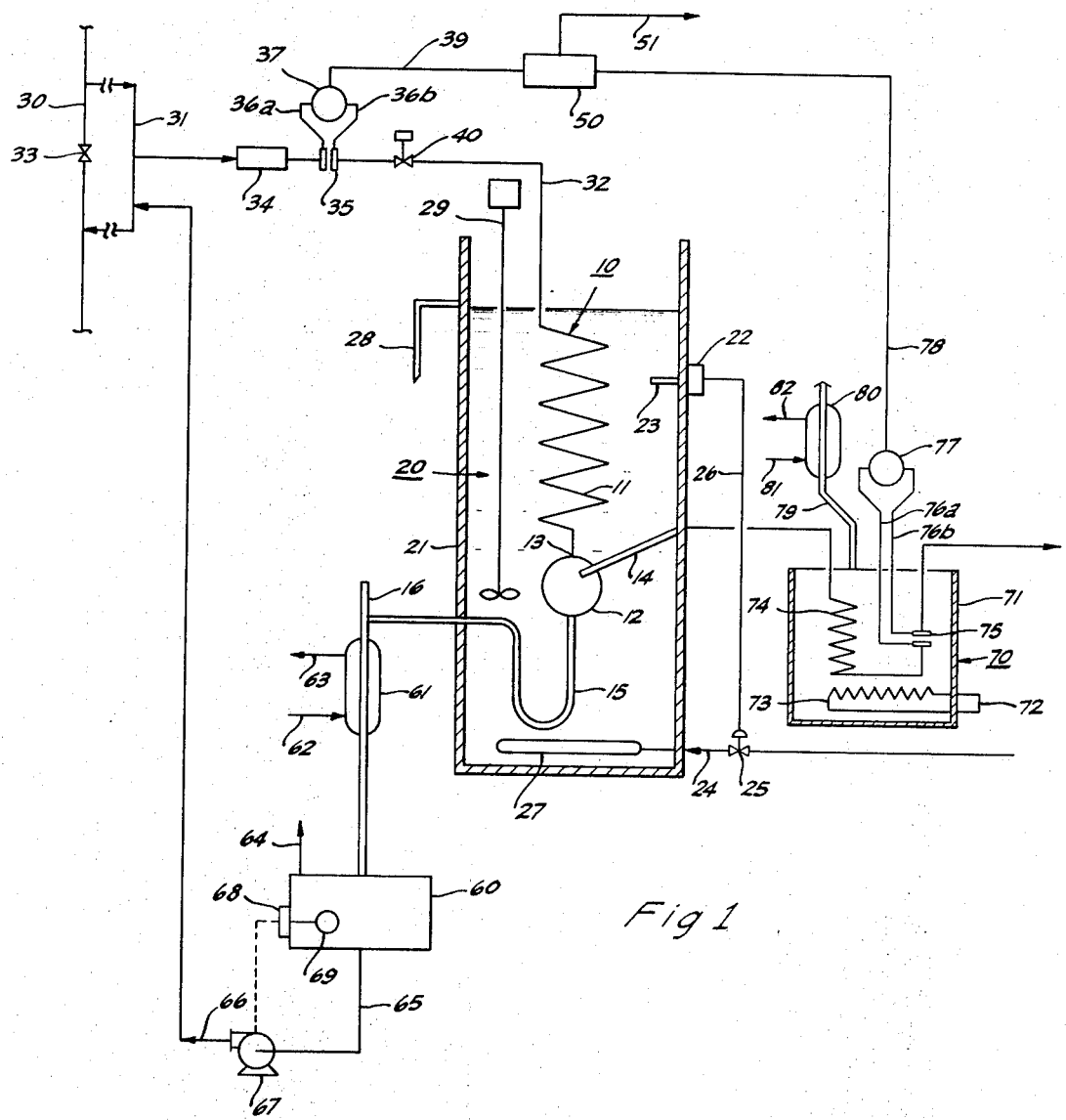
FIG. 1 is a schematic illustration of the continuous vapor-liquid ratio measuring apparatus of this invention.

The vapor-liquid ratio measuring apparatus of this invention can best be described with reference to FIG. 1, which is a schematic diagram illustrating a preferred embodiment of the apparatus. Referring now to FIG. 1, vapor-liquid equilibrium apparatus 10 comprising vaporization tube 11, falling film separator 12, vapor withdrawal tube 14 and liquid withdrawal tube 15 is suspended in constant temperature bath 20. Constant temperature bath 20 comprises a vessel or container 21 adapted to contain a reservoir of heated liquid having the vapor-liquid equilibrium apparatus suspended therein. Water is a convenient heating medium, although oil or other liquids can also be employed. The bath temperature is regulated at the preselected test temperature by temperature controller 22 which is responsive to temperature detector 23 positioned in the liquid reservoir and which controls the heat input to the bath. Temperature controller 22 preferably has a range of from at least about 100°F. to about 160°F., a set point adjustable over this range, and a sensitivity sufficiently high to permit control of the bath temperature within ±0.1°F. of the set point. Any commercial temperature regulation device having these capabilities can be employed.

The liquid in constant temperature bath 20 can be heated by any convenient means such as by electric resistance heaters, indirect heat exchange with hot fluids, etc. In the illustrated apparatus, water is employed as the bath liquid and heating is accomplished by injecting low pressure steam directly into the liquid. Low pressure steam is introduced through line 24 at a rate controlled by valve 25. Valve 25 is responsive to temperature controller 22 through signal transmission line 26, which can be an electrical or pneumatic conductor depending on the control means selected. Steam line 24 is fitted with diffuser 27 through which the steam is injected into the liquid reservoir. The injected steam condenses and excess water overflows through overflow drain 28 located so as to maintain a constant water level in the bath sufficient to keep vapor-liquid equilibrium apparatus 10 submerged. The liquid reservoir is agitated by any suitable mechanical or air agitation means, such as propeller agitator 29 illustrated in FIG. 1.

Vaporization tube 11 is a section of relatively small diameter metal tubing supported within constant temperature bath 20 so as to have a downward slope providing continuous drainage without pockets or liquid traps. The tube must be of sufficient length to permit heating of the liquid sample substantially to the bath temperature to assure that equilibrium is closely approached. In the usual case vaporization tube 11 should have a length of at least 20 feet. As a matter of convenience, the tube can be formed into a helical configuration, or other compact shape, so long as no liquid traps are created within the tube.

Falling film separator 12 is positioned immediately below vaporization tube 11 and receives the combined vapor and liquid effluent from the tube through flared nozzle 13. Nozzle 13 has a cross section approximately coincident with that of vaporization tube 11, and expands therefrom to provide a relatively smooth transition from the small cross section of the vaporization tube to the larger cross section of separator 12. This flared entry facilitates the flow of liquid downwardly along the interior walls of separator 12 to produce the falling film effect. Separator 12 is desirably formed in the shape of a hollow sphere to further facilitate formation of the falling liquid film. The liquid residue remaining from the equilibrium vaporization flows downwardly into liquid withdrawal tube 15 which has a U-shaped section forming a liquid seal to prevent vapors from escaping separator 12 through tube 15. Tube 15 is below the bottom of separator 12 so that the liquid residue will drain into the tube, thus preventing the accumulation of a reservoir of liquid in the separator. Except for the volume of the film, there would be no liquid holdup in the separator. Vapor tube 14 passes in a generally upwardly direction from the upper section of separator 12 so as to prevent liquid from flowing out of the separator with the withdrawn vapors. Tube 14 extends into separator 12 sufficiently to further prevent the flow of liquid from the inner surface of the wall into the tube.

Although any convenient method of obtaining a continuous representative sample of the blended liquid product can be employed, time lags in sampling can usually be reduced by circulating a small slipstream of liquid product to the test apparatus, and then withdrawing the sample at that point. In the illustrated embodiment, product line 30 is located remote from the test apparatus. Circulation line 31 extends from product line 30 to the test apparatus and back to line 30 at a point of lower pressure downstream of pressure reducing valve 33, or at some similar point of lower pressure. Sample tube 32 extends from circulation line 31 to vaporization tube 11. Filter 34, orifice plate 35 and flow regulation valve 40 are positioned in sample tube 32. Differential pressure transmitter 37, having orifice leads 36a and 36b communicating with sample line 32 at orifice plate 35, measures the pressure difference across the orifice plate. A signal proportional to the flow rate in line 32 is transmitted to analog computer 50 via signal transmission line 39, which in the illustrated apparatus is pneumatic tubing.

Since liquid residue withdrawn from separator 12 via tubing 15 is of no further consequence in the determination of vapor-liquid ratio, it can be disposed of in any convenient manner. For example, in the apparatus of FIG. 1, liquid residue exiting vapor-liquid equilibrium apparatus 10 is returned to product line 30 with the circulating slipstream. Liquid withdrawn from separator 12 passes to surge tank 60 via withdrawal tube 15. Withdrawal tube 15 passes through cooler 61, through which cooling water is circulated via lines 62 and 63. Where desired, cooler 61 can be emitted and the liquid returned without cooling. Surge tank 60 is vented to the atmosphere through vent 64. Liquid accumulated in surge tank 60 is pumped through lines 65 and 66 by pump 67 to circulating line 31 at a point downstream of sample line 32. Pump 67 is controlled by level controller 68 having float 69 responsive to the liquid level in surge tank 60. Atmospheric vent 16 is provided in liquid withdrawal tube 15 to prevent any syphon effect through tube 15 and to assure that separator 12 operates at substantially atmospheric pressure.

Vapor withdrawn from falling film separator 12 is at its dew point. Because of the possibility of condensation occurring as these vapors leave constant temperature bath 20, which would unduly complicate the measurement of the vapor rate, the withdrawn vapors are superheated to a preselected temperature. In the illustrated apparatus, the superheating and measuring is accomplished in vapor flow measuring device 70. Vapor flow measuring device 70 comprises enclosed container 71 adapted to contain a bath of boiling water. Water in container 71 is maintained at its boiling point by means of electric heater 72 having heating element 73 immersed in the boiling water. Vapor withdrawal tube 14 extends from falling film separator 12 to the exterior of constant temperature bath 70 and through vapor flow measuring device 70 to atmospheric discharge at a safe location. Vapor withdrawal tube 14 has coiled section 74 and orifice plate 75 located within the boiling water bath. Orifice leads 76a and 76b communicate with differential pressure transmitter 77 positioned external to container 71. Differential pressure transmitter 77 transmits a signal proportional to the vapor flow rate to analog computer 50 via signal transmission line 78. Water vapor generated in container 71 passes through vent 70 and condenser 80. Substantially all of the water vapor is condensed and returned downwardly through vent 79 to container 71. Cooling water is circulated through condenser 80 by means of water line 81 and 82.

Analog computer 50 can be any analog device capable of simultaneously receiving a first analog input signal proportional to the volume flow rate of liquid sample charged to vaporization tube 11, a second analog signal proportional to the vapor flow rate, and dividing the second analog signal by the first analog signal to obtain a quotient. This quotient is the measured vapor-liquid ratio and can be indicated, recorded, and further used as the input signal to apparatus for controlling a blend composition. Suitable analog devices performing this function are pneumatic and electrical relays, force bridges, ratio flow controllers and the like. As previously stated, either pneumatic or electrical control systems can be employed. Alternatively, the output of differential pressure transmitters 37 and 77 can be read and the corresponding vapor-liquid ratio manually calculated from time to time.

Although differential pressure instruments are utilized in the illustrated apparatus to measure the liquid and vapor volume flow rates, any flow measurement device can be suitably employed.

In operation the various cooling and heating systems are activated and the bath temperature set at the appropriate test temperature by adjustment of the set point of temperature recorder 22. Liquid sample is caused to flow through sample tube 32 at a rate in the range of 50 ml./min. by adjustment of flow regulator 40. The actual flow rate employed is not critical so long as the flow capacity of the system is not exceeded. Once steady state conditions have been reached the vapor-liquid ratio of the liquid mixture can be directly read, or used to reset the flow proportioning equipment to control the blend composition. Alternatively, where vapor-liquid ratios are periodically determined at several different temperatures, it may be convenient to provide several analyzers, each set at one of the different temperatures. The product sample can then be simply manifolded to the appropriate analyzer, thus dispensing with the necessity of changing bath temperature.

Although suitable for most control applications, the vapor-liquid ratio obtained by means of the apparatus of FIG. 1 is an approximation of the true vapor-liquid ratio as two simplifications are incorporated into the design of this apparatus.

Firstly, the temperature of the liquid sample is uncontrolled and the liquid volume flow is measured at essentially the temperature of the blended liquid product flowing through line 30. Under proposed ASTM test procedures, the volume of the liquid sample is measured at a temperature of 32–40°F. Usually the error introduced by failure to correct for the volume expansion of the liquid sample is small, and can be neglected. However, where the sample temperature is greatly different from the recommended value or where wide temperature fluctuations are experienced, it may be necessary to provide for temperature correction. Temperature correction can be achieved by physically cooling the sample stream to a temperature of 32–40°F. prior to measurement of the volume flow rate, or by providing temperature compensation to correct the actual flow volume to the standard temperature.

Secondly, vapor-liquid separator 12 is operated at a pressure slightly above atmospheric, which can deviate from the ASTM recommended standard of 760 mm. Hg. Since the vapors in separator 12 must flow through vapor tube 14 and orifice plate 75 prior to discharge to the atmosphere, the pressure in separator 12 will be above atmospheric by the amount of the pressure drop through this apparatus. The positive pressure in separator 12 is reflected in a difference in liquid elevation in the two legs of the U-section of liquid withdrawal tube 15. Needless to say, the legs must be sufficiently long to accommodate this difference. Although the error introduced by the slight positive pressure in separator 12 is usually small and of substantially the same magnitude from test to test, therefore having but little effect on the repeatability of vapor-liquid ratio determinations, the error can be minimized by appropriate design of the apparatus, particularly the vapor withdrawal and volume flow measuring devices. Where further accuracy is desired, the measured vapor-liquid ratio can be corrected according to the following equation:

$$-\frac{d(V/L)}{dp} \cong 0.1 \frac{V/L}{\text{mm. Hg.}}$$

where $d(V/L)/dp$ represents the change in vapor-liquid ratio with a change in pressure. Thus, according to the above equation, $-0.1$ $V/L$ unit must be added to the measured vapor-liquid ratio for each 1.0 mm. Hg by which the pressure in the separator exceeds 760 mm. Hg.

Theoretically, the vapor-liquid equilibrium apparatus of this invention operates with the efficiency of one theoretical plate. Ideally, the vapor and liquid phases in the separator are in equilibrium at the same temperature. The withdrawn vapor is at its bubble point. By definition, the liquid residue of a theoretical separation has a zero vapor-liquid ratio at the temperature and pressure of the separation. The approach to ideality can therefore be determined by measurement of the vapor-liquid ratio of the withdrawn liquid residue remaining from the equilibrium vaporization. In practice, liquid residues having vapor-liquid ratios of less than 0.1 are achieved, indicating a relatively close approach to a true equilibrium separation. Further, vapor-liquid ratios measured by the continuous method of this invention compare favorably with values determined by the static method conventionally employed for laboratory analysis.

Figure 2:
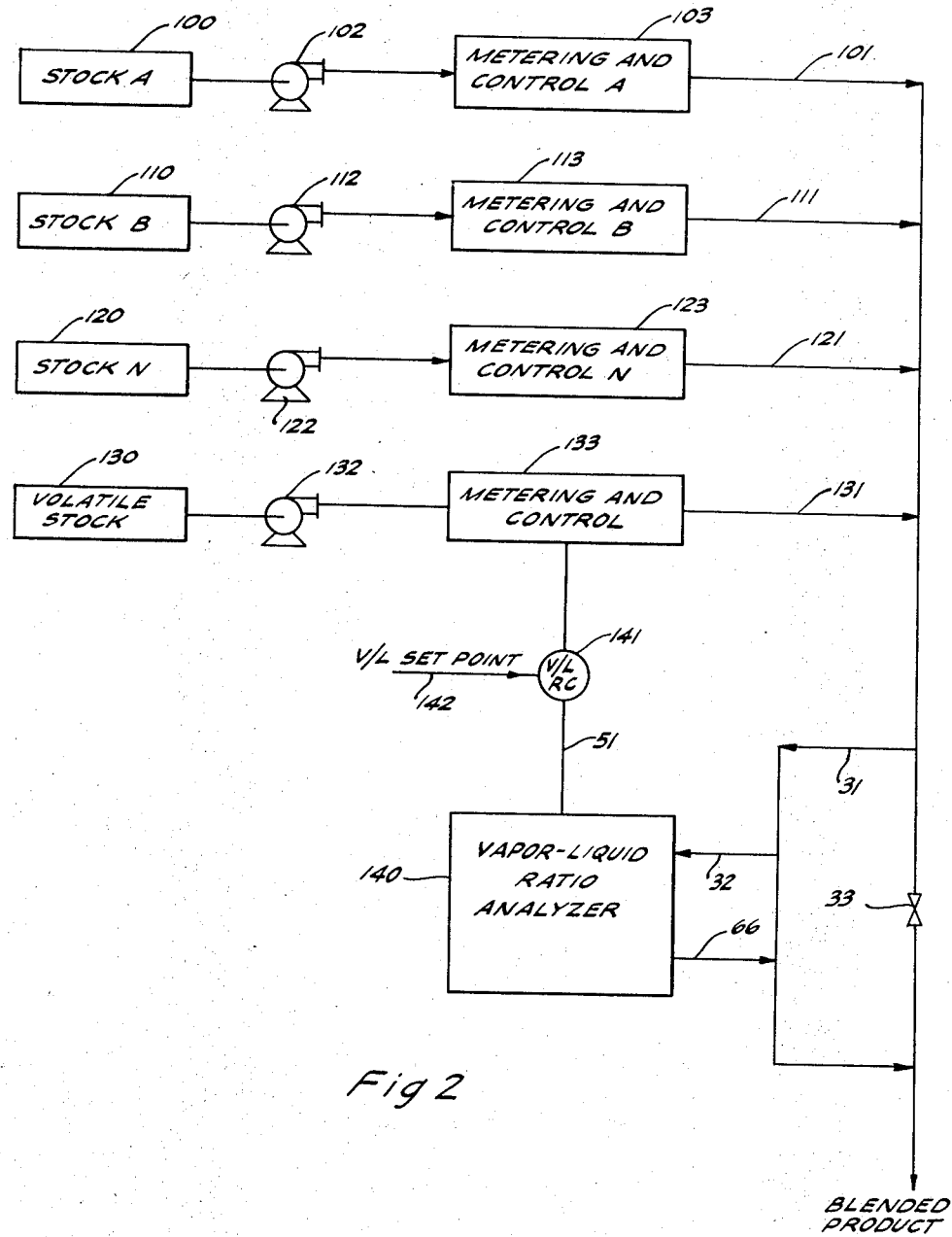
FIG. 2 is a flow diagram of a liquid blending system for the production of a blended product having a predetermined vapor-liquid ratio.

FIG. 2 is a simplified flow diagram of a blending system for producing a multicomponent blended liquid product having a predetermined vapor-liquid ratio and is particularly adapted to the blending of gasoline. FIG. 2 primarily shows the adaptation of the continuous vapor-liquid ratio analyzer of this invention to automatic control of a continuous blending process. In this process, any number of stock components, identified as stocks A through N, and a volatile stock component are admixed in controlled proportions to produce a blended product having a controlled vapor-liquid ratio. The proportion of volatile stock in the blend is varied as necessary to achieve a desired vapor-liquid ratio intermediate in value between the individual vapor-liquid ratios of the various liquid components.

Referring now to FIG. 2, stock component A is pumped from source 100 through component line 101 to blended product line 30 by pump 102 at a rate controlled by metering and control device 103. Similarly, stocks B and N are pumped from sources 110 and 120 through component lines 111 and 121 to blended product line 30 by pumps 112 and 122 at rates controlled by metering and control devices 113 and 123, respectively. In a like manner, the volatile stock is pumped from source 130 through component line 131 to product line 30 by pump 132 at a rate controlled by metering and control device 133. The above blending method is generally illustrative of many conventional continuous blending schemes. Stock sources 100, 110, 120, and 130 can be storage tanks, pipelines, tank cars, tank trucks, drums, weigh tanks or other devices for storage of liquid materials. Stocks A, B, and N are representative of any number of separate liquid components. In the case where the blended product is gasoline, these stocks can represent gasoline stocks, liquid dye solutions, corrosion inhibitors, additives, and antiknock fluids such as tetraethyl lead and tetramethyl lead. Vapor-liquid control is usually achieved by controlling the proportion of the most volatile component in the blend, although the proportions of two or more components can be controlled by a single vapor-liquid ratio analyzer where necessary. Again in the case of gasoline production, the volatile stock is usually butane or natural gasoline, but not necessarily so, as the proportion of any of the more volatile components can be controlled. Pumps 102, 112, 122 and 132 can be deleted where the individual stocks are under sufficient pressure or at sufficient hydrostatic head to cause them to flow to product line 30 without additional energy.

Metering and control devices 103, 113, 123 and 133 represent any means for controlling the proportion of each stock in the final blend. In the simplest case, a conventional flow ratio controller responsive to differential pressure across an orifice plate or venturi is located in each component line. Each of these controllers receives a signal proportional to the flow of blended product in line 30 and each controls the flow of individual stocks according to a preset ratio by throttling a flow control valve in the appropriate component line. The ratio setpoint of control device 133 is automatically adjusted by the output signal from the vapor-liquid ratio analyzer, either directly or through a cascade control system. This simple ratio control method is not sufficiently accurate for close blending jobs, such as the production of a blended gasoline product. Accordingly, superior accuracy can be achieved by mechanical or electronic proportioning systems wherein the flow of each stock is more accurately determined by means of positive displacement or turbine type meters, and wherein the proportion of each stock is controlled according to predetermined values. Again, the volatile stock control device has an automatically adjustable proportional control reset by the output signal from the vapor-liquid ratio analyzer so that the proportion of volatile stock is controlled to yield a blended product of preset vapor-liquid ratio. Even more improved blending accuracy can be achieved with analog or digital computing systems employed to control the blend composition in the foregoing manner.

Whatever measuring and control system is employed, vapor-liquid analyzer 140 is incorporated into the control scheme in essentially the same manner. As previously described, a slipstream of liquid product is withdrawn from product line 30 and circulated to analyzer 140 by circulating line 31. The circulating slipstream is returned to product line 30 at a lower pressure point, such as below valve 33. Sample is withdrawn from line 31 through line 32, and liquid residue returned to line 31 by line 66 at a point downstream of the sample point. The withdrawn sample is analyzed in the previously described manner to determine the vapor-liquid ratio continuously. An analog signal proportional to the measured vapor-liquid ratio is continuously transmitted to vapor-liquid ratio controller (V/L RC) 141 by means of signal transmission line 51. As previously explained, the control mode can be either electric or pneumatic, or combinations of these two. Vapor-liquid ratio controller 141 detects any difference in the measured vapor-liquid ratio from that preset by adjustment of set point adjustment 142, and transmits a controlled output signal via signal transmission line 143 to metering and control device 133 to reset the proportion of volatile stock entering the blend. Alternatively, analog signal 51 can be transmitted directly to analog or digital computing devices having the desired or target vapor-liquid ratio programmed into them, and which automatically compute and execute the composition change required to achieve the target vapor-liquid ratio.

While a particular apparatus for continuously measuring the vapor-liquid ratio of a multicomponent liquid mixture, and particular methods of analysis and of continuously blending a liquid product to a controlled vapor-liquid ratio have been described, it will be understood that the invention is not limited thereto since many modifications in the method and apparatus can be made, and it is intended to include within the scope of the invention any such modifications.

I claim:

1. A method of blending a plurality of liquid components of varying volatilities to continuously produce a liquid product having a controlled intermediate vapor-liquid ratio when measured at a predetermined test temperature, which comprises:

simultaneously transferring each of said liquid components from a liquid component source to a common product conduit at volume flow rates controlled to maintain the proportion of each component in the blend at selected values;

continuously withdrawing a sample of said blended liquid product from said product conduit;

heating said withdrawn sample by continuously passing said liquid downwardly through a tube surrounded by a medium heated to said test temperature so that the components of said liquid sample boiling below said test temperature are vaporized;

passing the effluent from said vaporization tube downwardly to a vapor-liquid separator positioned within said heated medium below said vaporization tube, said liquid portion of said effluent flowing downwardly as a film on the inner surface of said separator;

withdrawing said liquid portion from the bottom of said separator to prevent accumulation of a liquid reservoir within said separator;

withdrawing vapor from an upper portion of said separator;

measuring the volume flow rate of said liquid charged to said vaporization tube;

measuring the volume flow rate of said vapor withdrawn from said separator;

continuously determining the vapor-liquid ratio of said sample by dividing said measured vapor flow rate by said measured liquid flow rate; and adjusting the proportion of components in said blended liquid product to maintain said vapor-liquid ratio of said blended product at a predetermined value.

2. The method of claim 1 including the additional step of generating an analog signal proportional to the measured vapor-liquid ratio of said sample.

3. The method of claim 2 wherein said proportion of components in said blended liquid product is automatically adjusted responsive to said analog signal proportional to said vapor-liquid ratio of said sample.